United States Patent [19]

Sinclair et al.

[11] Patent Number: 4,477,535
[45] Date of Patent: Oct. 16, 1984

[54] COATED PAPERS

[75] Inventors: Alvin R. Sinclair; Edward H. Gleason, both of Beaver, Pa.

[73] Assignee: Polysar International S.A., Switzerland

[21] Appl. No.: 492,713

[22] Filed: May 9, 1983

Related U.S. Application Data

[62] Division of Ser. No. 279,951 Jul. 2, 1981, Pat. No. 4,413,068.

[51] Int. Cl.$^3$ .................. B32B 27/10; B05D 3/02; C08L 9/08
[52] U.S. Cl. .................. 428/476.3; 428/478.8; 428/511; 428/514; 427/391; 525/201; 525/902
[58] Field of Search .............. 428/514, 511, 476.3, 428/478.8; 427/391; 162/168 N

[56] References Cited

U.S. PATENT DOCUMENTS 4,258,104  3/1981  Lee et al. .................. 428/514 X
4,265,977  5/1981  Kawamura et al. ............ 428/514 X Primary Examiner—Patricia C. Ives
Attorney, Agent, or Firm—Stevens, Davis, Miller & Mosher

[57] ABSTRACT

Paper having enhanced gloss and pick resistance may be prepared using as a binder a latex of heterogeneous particles having a core and shell type structure. The polymer particles have a composition such that the shell is harder than the core.

10 Claims, No Drawings

COATED PAPERS

This is a division of application Ser. No. 279,951 filed July 2, 1981, now U.S. Pat. No. 4,413,068.

BACKGROUND OF THE INVENTION

The present invention relates to an improved method for enhancing the gloss and pick resistance of paper. The present invention also relates to SBR latices useful in manufacturing paper having enhanced pick and gloss.

It is known to manufacture paper having improved pick and gloss character by coating the paper with a styrene-butadiene composition. Unfortunately the gloss and pick characteristics of a paper manufactured by this method relate to the respective styrene and butadiene content of the latex. Accordingly, with a given styrene-butadiene latex formulation an increase in the binding power will result in related decrease in the ability to impart gloss and stiffness to paper. Attempts were made to obtain both a high binding character and good gloss and stiffness by using a blend of latices in the manufacture of paper. Unfortunately, such a procedure tends to be difficult due to compatability problems of the latices used. In addition, such blends of latices suffer from a low gloss. There is a need for a latex for use in the manufacture of coated paper which exhibits superior qualities with regard to binding strength and pick.

PRIOR ART

There is extensive art relating to processes by which a polymeric material may be modified. As with latices early attempts were made to modify plastics merely by blending different resins. It was found that the physical properties of a blend of resins could not be predicted by relative weight averaging the properties of the individual resins in the blend. Often the properties of the blend were inferior to those of the individual resins used in the blend. As a result of this experience graft polymerization and laminating techniques were developed in the plastics art.

In the field of emulsion polymerization "seed", "in-situ seed" and "incremental" polymerization techniques were developed. These methods indicated that it was possible to vary the monomer ratios used in the preparation of the "seed" and in the subsequent polymerization. Furthermore it was also realized in incremental polymerization that the ratio of the monomers in the increments could be changed. This has led to attempts to prepare latices containing heterogeneous particles which are manufactured to have the most desirable physical properties of different types of polymers. This art has been used extensively in the field of rubbery acrylic polymers, and ethylene and vinyl chloride polymers. The following are illustrative of some of the art in this field:

U.S. Pat. No. 4,107,120 issued June 17, 1976 to Rohm and Haas;

U.S. Pat. No. 3,985,707 issued June 24, 1975, to Rohm and Haas;

Japanese Pat. No. 73 34,224 issued May 17, 1973, to Sanyo Pulp Co. Ltd; and

U.S. Pat. No. 3,687,884 issued Aug. 30, 1970 to Westvaco.

In this art there is a tendency to talk of "soft" polymers and "hard" polymers. The soft polymers tend to be film forming polymers at a processing temperature and provide the "binding" properties of the latex. The hard polymers usually have a glass transition temperature greater than the process temperature. These polymers provide the stiffness and gloss imparting characteristics of the latex. In the art relating to monovinylidene aromatic and aliphatic conjugated diene polymers the "hard" monomer is usually the monovinylidene aromatic monomer and the "soft" monomer is usually the aliphatic conjugated diene monomer.

Incremental polymerization techniques have been used in the latex area to prepare carboxylated-styrene-butadiene latices. A problem in preparing a commercial carboxylated SBR latex was reproducibility. Belgian Pat. No. 766,365 in the name of Farbwerke Hoechst Aktiengeschellshaft Vormals Meister Lucius and Bruning, laid open to public inspection Oct. 21, 1971 suggests that the problem may be overcome by an incremental polymerization. In the first stage from about 75% to 95% of a monomer composition of 50-70 wt% styrene and 50-30 wt.% butadiene is polymerized at an alkaline pH. An increment of 10-50 wt.% of an unsaturated acid, 90 to 50 wt.% of styrene and 0-40% butadiene is added to the reactor and polymerized to about 96%. The ratio of the initial monomer mixture to the increment was such that the resulting latex had a carboxylic acid content of from about 0.2 to 5 wt.%. The resulting latex had a solids content of greater than 20%, preferably between 40 and 60 weight %.

The purpose of the Hoechst patent was to avoid polymerization in an acidic medium as this was, at the time, difficult to control and resulted in poor reproducibility. As a result the latex of the Hoechst process likely contains an initial domain which has very little or no carboxylation. The latices of the present invention have particles which have an initial domain containing about 0.5 to 5 weight % carboxylation. Additionally, the latices of the present invention are tetrapolymers containing acrylamide as the fourth monomer.

U.S. Pat. No. 4,134,872 issued Jan. 16, 1979, to Dow Chemical teaches a method for the manufacture of a latex which is a tripolymer, and such latices per se. In the Dow latex the heterogeneous polymer particles have a soft and hard domain. The soft domain is polymerized in the presence of the hard domain which is predominantly styrene. The soft domain comprises about 50 to 90 parts by weight of the heterogeneous particle and is formed by polymerizing (a) from about 30 to 69 weight % of a monovinylidene aromatic monomer, (b) from about 30 to 60 weight % of $C_{4-9}$ aliphatic conjugated diene, and (c) from about 1 to about 10 weight % of a monoethylenically unsaturated carboxylic acid.

The latices of the present invention are distinct over the latices taught by the Dow patent in that the latices of the present invention are tetrapolymers, containing acrylamide which is not present in the Dow latices. Additionally, the latices of the present invention comprise an initial domain containing from about 55 to 65 parts by weight of a monovinylidene aromatic monomer and from about 45 to 35 parts by weight of an aliphatic $C_{4-6}$ conjugated diene and a subsequent domain containing from about 75 to 85 parts by weight of a monovinylidene aromatic monomer and from about 25 to 15 parts by weight of an aliphatic $C_{4-6}$ conjugated diene monomer.

British Pat. No. 1,157,069 published July 2, 1969, in the name of Koppers Company Inc. (corresponding to Canadian Pat. No. 813,961 and U.S. Pat. No. 3,487,032) teaches the incremental polymerization of a tertiary polymer consisting of 20 to 70 parts of monovinylidene aromatic monomer, 80 to 30 parts of a conjugated diolefin and per 100 parts of the total of monovinylidene aromatic monomer and conjugated diolefin, 0.1 to 5 parts of an ethylenically unsaturated carboxylic acid and 0.1 to 5 parts of a primary amide. The Koppers Patent disclosed that the monovinylidene aromatic polymer and the conjugated diene may be pre-blended and that the ethylenically unsaturated carboxylic acid monomer and the primary amine monomer may be preblended. Each of these monomer pre-blends may then be added to the reactor as a heel and also as at least one increment. The present latices are distinct over the Koppers latices in that, according to Koppers, once the pre-blend of monovinylidene aromatic monomer and conjugated diene is prepared the ratio of these components in the polymer is relatively fixed, whereas in the present invention the ratio of monovinylidene aromatic monomer and aliphatic $C_{4-6}$ conjugated diene in the different domains in the heterogeneous latex particles are significantly different.

As used herein the term domain refers to a region in or on a polymer particle in the latex, which is different from an adjacent region. The different domains of a heterogeneous particle may in fact form a true core shell structure. Thus the structure of the central core area of the particle would differ from the structure of the surface covering the entire core area. If a domain does not cover the entire surface of the latex particle, the particle would have "continents". Thus the particle may have continuous central domain with different and discontinuous domains on the surface of the continuous domain. Depending upon the solubility of the monomers in the increment, in the initial domain, the particle may have a substantially uniform surface or shape with discreet areas within the particle having a different chemical make up (i.e. a heterogeneous particle). While not wishing to be bound by any particular theory, the applicant believes that in the latices of the present invention the predominance of particles have a "core/shell" structure, wherein the "shell" has a higher content of monovinylidene aromatic monomer than the "core". Such structure might be classified as "soft core/hard shell" particles.

DESCRIPTION OF THE INVENTION

The present invention seeks to provide a novel latex and papers coated with the latex which have enhanced strength and pick resistance.

SUMMARY OF THE INVENTION

The present invention provides a latex comprising about 40 to 60 weight percent of heterogeneous polymer particles which have:

(1) an initial domain comprising about 50% by volume of the particle which is a polymer of a monomer composition comprising:
   (a) From about 55 to about 65 parts by weight of a monovinylidene aromatic monomer;
   (b) From about 45 to about 35 parts by weight of an aliphatic $C_{4-6}$ conjugated diene monomer; and per 100 parts by weight of the total of said monovinylidene aromatic monomer and said aliphatic $C_{4-6}$ conjugated diene monomer;
   (c) From about 0.5 to 5 parts by weight of a $C_{3-6}$ ethylenically unsaturated carboxylic acid, anhydrides thereof or mixtures thereof and
   (d) From about 0.5 to 5 parts by weight of a $C_{3-6}$ ethylenically unsaturated primary amide or a mixture thereof;

(2) A subsequent domain comprising about 50% by volume of the particle which is a polymer of a monomer composition comprising:
   (a) From about 75 to 85 parts by weight of a monovinylidene aromatic monomer;
   (b) From about 25 to 15 parts by weight of an aliphatic $C_{4-6}$ conjugated diene monomer; and per 100 parts by weight of the total of said monovinylidene aromatic monomer and said aliphatic $C_{4-6}$ conjugated diene monomer;
   (c) From about 0.5 to 5 parts by weight of $C_{3-6}$ ethylenically unsaturated carboxylic acid, anhydrides thereof, or mixtures thereof and
   (d) From about 0.5 to 5 parts by weight of a $C_{3-6}$ ethylenically unsaturated primary amide or a mixture thereof;

The present invention also provides:

In a method of manufacturing coated paper having enhanced gloss and pick resistance, the improvement comprising incorporating into the paper coating composition a latex comprising about 40 to 60 weight percent of heterogeneous polymer particles which have:

(1) an initial domain comprising about 50% by volume of the particle which is a polymer of a monomer composition comprising:
   (a) From about 55 to about 65 parts by weight of a monovinylidene aromatic monomer;
   (b) From about 45 to about 35 parts by weight of an aliphatic $C_{4-6}$ conjugated diene monomer; and per 100 parts by weight of the total of said monovinylidene aromatic monomer and said aliphatic $C_{4-6}$ conjugated diene monomer;
   (c) From about 0.5 to 5 parts by weight of $C_{3-6}$ ethylenically unsaturated carboxylic acid, anhydrides thereof, or a mixture thereof and
   (d) From about 0.5 to 5 parts by weight of a $C_{3-6}$ ethylenically unsaturated primary amide or a mixture thereof;

(2) A subsequent domain comprising about 50% by volume of the particle which is a polymer of a monomer composition comprising:
   (a) From about 75 to 85 parts by weight of a monovinylidene aromatic monomer;
   (b) From about 25 to 15 parts by weight of an aliphatic $C_{4-6}$ conjugated diene monomer; and per 100 parts by weight of the total of said monovinylidene aromatic monomer and said aliphatic $C_{4-6}$ conjugated diene monomer
   (c) From about 0.5 to 5 parts by weight of $C_{3-6}$ ethylenically unsaturated carboxylic acid, anhydrides thereof or a mixture thereof and
   (d) From about 0.5 to 5 parts by weight of a $C_{3-6}$ ethylenically unsaturated primary amide or a mixture thereof;

DETAILED DESCRIPTION

Latices in accordance with the present invention may be prepared using standard incremental emulsion polymerization techniques. Suitable emulsifier, soaps, electrolytes, initiators and "short stops" are well known to those skilled in the art.

Monovinyl or vinylidene aromatic monomers useful in accordance with the present invention are monomers of the formula:

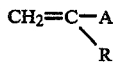

wherein R is a hydrogen atom or a $C_{1-4}$ alkyl radical and A is a $C_{-6}$ aromatic radical which is unsubstituted or substituted by at least one $C_{1-4}$ alkyl radical or chlorine or bromine.

Such monomers include styrene, α-methyl styrene, vinyl toluene and lower alkyl and chloro and bromo derivatives thereof. The preferred monomer is styrene.

Suitable aliphatic $C_{4-6}$ conjugated diene monomers useful in accordance with the present invention include 1,3 butadiene, 2-methyl-1,3-butadiene and pentadiene. The preferred aliphatic $C_{4-6}$ conjugated dienes are 1,3 butadiene and isoprene.

Useful $C_{3-5}$ ethylenically unsaturated carboxylic acid may contain two carboxylic acid groups. Suitable acids include itaconic acid, fumaric acid, maleic acid, acrylic acid and methacrylic acid.

Suitable $C_{3-6}$ ethylenically unsaturated primary amides include acrylamide, methacrylamide, ethacrylamide and crotonamide and homologues thereof and mixtures thereof. N-methylol acrylamide may be used in place of the primary amide.

The latices of the present invention may be prepared using conventional emulsion polymerization techniques, known in the art. The polymerization may be an incremental process with the heel having a styrene:butadiene ratio of from 55:45 to 65:35 and the subsequent increments having a styrene:butadiene ratio of from 75:25 to 85:15. The volume of heel may be approximately equal to the total volume of the increment. The polymerization should be continued to produce a latex having a solids content of at least about 35 percent by weight. Preferably the solids content of the finished latex is in the range of 40 to 60 percent by weight.

The selection of appropriate surfactants, electrolytes, initiators and chain transfer agents is well known to those skilled in the art. Suitable agents are discussed in the aforesaid British Pat. No. 1,157,068 and U.S. Pat. No. 4,134,872. Care should be taken with regard to the amount of surfactant used in the polymerization process. The amount of surfactant used should be about the minimum to permit polymerization of the heel. Surfactant may be present in the incremental monomer change but it should be present in an amount so that the total overall surfactant concentration does not increase significantly above the minimum necessary amount. An excess of surfactant will create sites for independent polymerization of the incremental monomer resulting in a biphased latex. Such a latex is composed of two distinct groups of homogeneous particles having a different chemical composition and physical properties.

If desired the polymerization process may be a "seed" process where the initial domain is prepared as above and then in a subsequent reaction the second domain is polymerized in the presence of the first domain. The conditions with regard to the amount of surfactant used in the subsequent are the same as those described above for an incremental polymerization process.

After preparation, the pH of the latex may be adjusted to the basic range using suitable bases such as ammonia, and conventional thickeners and bactericides may be added. These adjustments are well known to those skilled in the art.

The resulting latex is useful in treating non woven fibrous products such as paper. Generally, the latex is blended with a filler such as clay and opacifying agent. The amount of filler/opacifying agent used will depend upon the formulation used by the paper manufacturer. Generally, the latex may be compounded with up to 400 parts by weight filler per 100 parts by weight of latex solids. Usually, the filler is present in an amount of from about 200 to 350 parts by weight per 100 parts of latex solids. If desired, the paper coating composition may contain relatively minor amounts of thickeners such as acrylate thickeners, binders such as starch or phenol formaldehyde or melamine formaldehyde may be included; or rheology control agents.

The paper coating compositions will vary depending upon the manufacturer's type of operations, preference and the type and quality of paper to be produced.

The paper coating formulation is applied to the paper using conventional equipment such as roll coaters, blade coaters, or air knife. After the coating is applied to the paper the paper is dried, usually by hot air, to produce a treated paper. The treated paper does not have a high gloss. The paper is then processed to provide a gloss using methods such as calendering or super calendering. The latices of the present invention not only provide superior gloss but do so under less severe calendering conditions than required in the prior art.

The present invention is illustrated by the following examples which are not intended to be limiting.

A typical formulation for the heel and increment is set forth in Table I.

TABLE I

|  | PARTS BY WEIGHT | | | |
|---|---|---|---|---|
|  | Charge 1 | Charge 2 | Total | |
|  | Heel | Addition | Solids | Volatiles |
| Styrene | 30.00 | 40.00 | 70.00 | — |
| Butadiene | 20.00 | 10.00 | 30.00 | — |
| Soaps: |  |  |  |  |
| Water | 100.00 | 20.00 | — | 120.00 |
| Surfactant | 3.0 | — | 2.6 | 0.40 |
| Unsaturated Acid Monomer | 1.5 | 1.5 | 3.0 | — |
| Unsaturated Amide Monomer | 1.5 | 1.5 | 3.0 | — |
| Water | — | 5.0 | — | 5.0 |
| Catalyst | 0.2 | 0.2 | 0.4 | — |
|  |  |  | 109.0 | 125.4 |

A ten gallon reactor was charged with a portion of the heel and hot polymerized for about 3 hours and then over a period of about 1 hour the remaining portion of the heel was added to the reactor. The increment was then added over about 2½ hours and the hot polymerization continued.

The reactor was maintained at the polymerization temperature for an additional 30 minutes and then stripped of residual monomer and the pH was adjusted to 8 with ammonia. The latex was treated with conventional bactericide and when desired a rheology agent to give the desired viscosity The resulting latex had the following physical properties:

TABLE II

| Solids Wt. % | 46.0 |
|---|---|
| pH | 9.0 |
| Surface Tension, Dynes/cm | 53.0 |
| Viscosity cps | 170.00 |

A number of high gloss paper coating formulations were made using comparative styrene-butadiene latices and the latex made by the above procedures.

The formulations were as follows:

TABLE III

| High Gloss Paper Coating Test Formulations | | |
|---|---|---|
| | A | B |
| #1 Coating Clay | 100 | 100 |
| Tetra sodium pyrophosphate | 0.1 | 0.1 |
| Ethylated Starch (PF 280) | — | 4.0 |
| Carboxymethyl Cellulose | 0.5 | — |
| Calcium Stearate | 0.75 | 0.75 |
| Melamine Formaldehyde Resin | — | 0.60 |
| Latex | 16.0 | 12.0 |
| Total Adhesive, % | 16 | 16 |
| Total Solids, % | 62 | 62 |
| pH | 8.5 | 8.5 |

The comparative latices used were commercially available latices having different ratios of styrene and butadiene. The papers treated with the above formulation were tested for gloss and pick using standard procedures namely Gloss 75° specular and IGT pick with a number 4 ink.

FIG. I is a plot of the resulting pick and gloss tests:

A blend of several runs of the latex, produced in the ten-gallon reactor, was used for producing both rotogravure and web offset grades of paper on a pilot model puddle blade coater. The coatings were prepared utilizing predispersed clay obtained from a paper mill plus mill starch. The temperature of the coating mix was estimated to be approximately 160° F. No difficulties were encountered during the mixing and the Latex blended well into the clay-starch mixture. The viscosity obtained was within the normal range for this coating formulation. The web offset formulation was prepared and applied to the coating base stock; first applying approximately 5.7 pounds coating to the wire side of the paper and then 4.3 pounds of coating to the top or felt side of the paper. This meets normal mill operations. The base stock was prepared on a paper machine which had a very definite two sided problem, thus it was necessary to apply a heavier weight of coating to the wire side of the paper than to the top side. The coating was applied to the paper at approximately 2,500 feet per minute. Operations of the coater and the flow characteristics of the coating in the nip, as it was being applied to the paper, indicated excellent flow characteristics were being obtained and no streaks or scratches were found. Both of the makeup characteristics of the latex as well as the performance under the blade and on the coater indicated superior stability of this latex. The offset formulation is as follows:

TABLE IV

| Web Offset Formulation | |
|---|---|
| Ingredients | Parts by Weight |
| #2 Coating Clay | 100 |
| Starch | 16 |
| Latex | 9.0 |
| Calcium Stearate | 1.0 |
| Total Solids = 54.3% | pH 8.0 |

A rotogravure grade of paper was prepared utilizing 8 parts of a blend of several runs of the latex from the 10 gallon reactor on the weight of 100 parts of dry clay with the latex being the sole binder, 0.1 pounds of Natrasol per 100 pounds of dry clay were added as a water holding medium for the formulation. The required amount of Natrasol* was added to a small amount of water in the mixer and allowed to blend until a uniform dispersion was obtained. To this water Natrasol* dispersion was added the slurry clay, and mixing took place until a uniform and smooth coating formulation was obtained, after which was added the Nopcote*-C-104-HS, which was followed by the latex. This mixture was allowed to blend together for approximately two hours to assure proper mixing. It was then pumped to the paper coater and applied to the raw stock. Good flow characteristics were obtained on the paper machine, no streaks or scratches were observed and the mill personnel were pleased with the performance of the latex at this high rate of speed and shear. The following day both sets of paper were supercalendered using a research department supercalender stack operated at 1,800 feet per minute. Various steam pressures were used on the supercalender starting with 13 pounds of steam and reducing at one pound increments to 9 pounds of steam in an effort to reduce the gloss value obtained so it would be in the normal operating range. The manufacturer normally uses 12 pounds of steam in order to get gloss values range in the mid-fifties. With the latex it was necessary to reduce to 9 pounds of steam in order to obtain these low gloss values. After supercalendering each of the rolls were sheeted and tested for gloss, gloss ink holdout, opacity, and compressability, porosity, brightness and IGT pick resistance using a Number 3 ink with A scale setting. In all, characteristics of the latex were equal to or superior to a latex which was used as control.

*Natrasol is a trademark for Hydroxy ethyl cellulose
*Nopcote is a trademark for emulsified calcium stearate Plant scale results are detailed in Table V.

TABLE V

| | Properties of Coated Paper Coated Web Offset Paper | | |
|---|---|---|---|
| Latex: | EXPERIMENTAL LATEX | DYLEX 55E* | POLY-SAR° |
| Coat Weight, Lbs/Ream | 5.2 | 5.7 | 5.4 |
| Brightness | 69.3 | 69.1 | 69.3 |
| Gloss | 64.3 | 54.0 | 60.00 |
| Ink Gloss | 69.7 | 64.0 | 63.3 |
| Opacity | 87.3 | 87.9 | 88.5 |
| Smoothness | 36.3 | 33.0 | 33.3 |
| % Compressability | 56.6 | 53.8 | 50.1 |
| Porosity | 2.3 | 2.0 | 4.9 |
| IGT #3 Ink 'A' Scale | 153 | 126 | 144 |

*Trademark of Polysar Limited

What is claimed is:

1. In a method of manufacturing a coated paper having enhanced gloss and pick resistance the improvement comprising incorporating into the pulp or the paper coating composition a latex having a solids content of from about 40 to about 60 weight percent comprising heterogeneous polymer particles which have
   (a) an initial domain, comprising from about 40 to about 60 percent by volume of the particles, which is a polymer of a monomer composition comprising:
      (i) from about 55 to about 65 parts by weight of a monovinylidene aromatic monomer;
      (ii) from about 45 to about 35 parts by weight of an aliphatic $C_{4-6}$ conjugated diene monomer; and
      per 100 parts by weight of the total of said monovinylidene aromatic monomer and said aliphatic $C_{4-6}$ conjugated diene monomer (iii) from about 0.5 to about 5 parts by weight of a C$_{3-6}$ ethylenically unsaturated carboxylic acid, an anhydride thereof, or mixtures thereof; and
(iv) from about 0.5 to about 5 parts by weight of a C$_{3-6}$ ethylenically unsaturated primary amide or N-methylol acrylamide; and
(b) a subsequent domain, comprising from about 60 to about 40 percent by volume of the particles, which is a polymer of a monomer composition comprising:
(i) from about 75 to about 85 parts by weight of a monovinylidene aromatic monomer;
(ii) from about 25 to about 15 parts by weight of an aliphatic C$_{4-6}$ conjugated diene monomer; and per 100 parts by weight of the total of said monovinylidene aromatic monomer and said aliphatic C$_{4-6}$ conjugated diene monomer
(iii) from about 0.5 to about 5 parts by weight of a C$_{3-6}$ ethylenically unsaturated carboxylic acid, an anhydride thereof, or mixtures thereof; and
(iv) from about 0.5 to about 5 parts by weight of a C$_{3-6}$ ethylenically unsaturated primary amide or N-methylol acrylamide.

2. A method according to claim 1 wherein the latex is incorporated into a paper coating and the first domain is the core portion of the heterogeneous particles and is a polymer of a monomer composition comprising:
(i) about 60 parts by weight of a vinyl aromatic monomer;
(ii) about 40 parts by weight of an C$_{4-6}$ conjugated diene; and per 100 parts by weight of the total of said monovinylidene aromatic monomer and said aliphatic C$_{4-6}$ conjugated diene monomer;
(iii) about 3 parts by weight of a C$_{3-6}$ ethylenically unsaturated carboxylic acid; and
(iv) about 3 parts by weight of a C$_{3-6}$ ethylenically unsaturated primary amide or N-methylol acrylamide.

3. A method according to claim 1 wherein the latex is incorporated into a paper coating and the subsequent domain forms the surface portion of the heterogeneous particles and is a polymer of a monomer composition comprising:
(i) about 80 parts by weight of a monovinylidene aromatic monomer;
(ii) about 20 parts by weight of an aliphatic C$_{4-6}$ conjugated diene monomer; and per 100 parts by weight of the total of said monovinylidene aromatic monomer and said aliphatic C$_{4-6}$ conjugated diene monomer
(iii) about 3 parts by weight of a C$_{3-5}$ ethylenically unsaturated carboxylic acid; and
(iv) about 3 parts by weight of a C$_{3-6}$ ethylenically unsaturated primary amide or N-methylol acrylamide.

4. A method according to claim 2 wherein the subsequent domain is the shell portion of the heterogeneous particles and is a polymer of a monomer composition comprising:
(i) about 80 parts by weight of a monovinylidene aromatic monomer;
(ii) about 20 parts by weight of an aliphatic C$_{4-6}$ conjugated diene monomer; and per 100 parts by weight of the total of said monovinylidene aromatic monomer and said aliphatic C$_{4-6}$ conjugated diene monomer;
(iii) about 3 parts by weight of a C$_{3-5}$ ethylenically unsaturated carboxylic acid; and
(iv) about 3 parts by weight of a C$_{3-6}$ ethylenically unsaturated primary amide or N-methylol acrylamide.

5. A method according to claims 2, 3 or 4 wherein said monovinylidene aromatic monomer is styrene; said aliphatic C$_{4-6}$ conjugated diene monomer is butadiene; said C$_{3-6}$ ethylenically unsaturated acid is itaconic acid; and said C$_{3-6}$ ethylenically unsaturated primary amide is acrylamide.

6. A paper coated with a composition wherein the film forming component comprises a latex having a solids content of from about 40 to about 60 weight percent comprising heterogeneous polymer particles which have
(a) an initial domain, comprising from about 40 to about 60 percent by volume of the particles, which is a polymer of a monomer composition comprising:
(i) from about 55 to about 65 parts by weight of a monovinylidene aromatic monomer;
(ii) from about 45 to about 35 parts by weight of an aliphatic C$_{4-6}$ conjugated diene monomer; and per 100 parts by weight of the total of said monovinylidene aromatic monomer and said aliphatic C$_{4-6}$ conjugated diene monomer;
(iii) from about 0.5 to about 5 parts by weight of a C$_{3-6}$ ethylenically unsaturated carboxylic acid, an anhydride thereof, or mixtures thereof; and
(iv) from about 0.5 to about 5 parts by weight of a C$_{3-6}$ ethylenically unsaturated primary amide or N-methylol acrylamide; and
(b) a subsequent domain, comprising from about 60 to about 40 percent by volume of the particles, which is a polymer of a monomer composition comprising:
(i) from about 75 to about 85 parts by weight of a monovinylidene aromatic monomer;
(ii) from about 25 to about 15 parts by weight of an aliphatic C$_{4-6}$ conjugated diene monomer; and per 100 parts by weight of the total of said monovinylidene aromatic monomer and said aliphatic C$_{4-6}$ conjugated diene monomer
(iii) from about 0.5 to about 5 parts by weight of a C$_{3-6}$ ethylenically unsaturated carboxylic acid, an anhydride thereof, or mixtures thereof; and
(iv) from about 0.5 to about 5 parts by weight of a C$_{3-6}$ ethylenically unsaturated primary amide or N-methylol acrylamide.

7. A paper according to claim 6 wherein in said latex the first domain is the core portion of the heterogeneous particles and is a polymer of a monomer composition comprising:
(i) about 60 parts by weight of a vinyl aromatic monomer;
(ii) about 40 parts by weight of an C$_{4-6}$ conjugated diene; and per 100 parts by weight of the total of said monovinylidene aromatic monomer and said aliphatic C$_{4-6}$ conjugated diene monomer
(iii) about 3 parts by weight of a C$_{3-6}$ ethylenically unsaturated carboxylic acid; and
(iv) about 3 parts by weight of a C$_{3-6}$ ethylenically unsaturated primary amide or N-methylol acrylamide.

8. A paper according to claim 6 wherein in said latex the subsequent domain is the shell portion of the heterogeneous particles and is a polymer of a monomer composition comprising:

(i) about 80 parts by weight of a monovinylidene aromatic monomer;

(ii) about 20 parts by weight of an aliphatic $C_{4-6}$ conjugated diene monomer; and per 100 parts by weight of the total of said monovinylidene aromatic monomer and said aliphatic $C_{4-6}$ conjugated diene monomer (iii) about 3 parts by weight of a $C_{3-5}$ ethylenically unsaturated carboxylic acid; and (iv) about 3 parts by weight of a $C_{3-6}$ ethylenically unsaturated primary amide or N-methylol acrylamide.

9. A paper according to claim 7 wherein in said latex the subsequent domain is the shell portion of the heterogeneous particles and is a polymer of a monomer composition comprising:

(i) about 80 parts by weight of a monovinylidene aromatic monomer;

(ii) about 20 parts by weight of an aliphatic $C_{4-6}$ conjugated diene monomer; and per 100 parts by weight of the total of said monovinylidene aromatic monomer and said aliphatic $C_{4-6}$ conjugated diene monomer (iii) about 3 parts by weight of a $C_{3-5}$ ethylenically unsaturated carboxylic acid; and (iv) about 3 parts by weight of a $C_{3-6}$ ethylenically unsaturated primary amide or N-methylol acrylamide.

10. A paper according to claims 7, 8, or 9 wherein said monovinylidene aromatic monomer is styrene; said aliphatic $C_{4-6}$ conjugated diene monomer is butadiene; said $C_{3-6}$ ethylenically unsaturated acid is itaconic acid; and said $C_{3-6}$ ethylenically unsaturated primary amide is acrylamide.

* * * * *